(12) United States Patent
Lee (10) Patent No.: US 11,889,044 B2
(45) Date of Patent: Jan. 30, 2024

(54) FUSION METHOD AND FUSION SYSTEM FOR MULTIPLE DEPTH INFORMATION

(71) Applicant: eYs3D Microelectronics, Co., Taipei (TW)

(72) Inventor: Chi-Feng Lee, Hsinchu County (TW)

(73) Assignee: EYS3D MICROELECTRONICS, CO., Taipei (TW)

( * ) Notice: Subject to any disclaimer, the term of this patent is extended or adjusted under 35 U.S.C. 154(b) by 140 days.

(21) Appl. No.: 17/233,306

(22) Filed: Apr. 16, 2021

(65) Prior Publication Data

US 2021/0329213 A1    Oct. 21, 2021

Related U.S. Application Data

(60) Provisional application No. 63/011,246, filed on Apr. 16, 2020.

(51) Int. Cl.

| H04N 13/128 | (2018.01) |
| H04N 13/243 | (2018.01) |
| H04N 13/161 | (2018.01) |
| H04N 13/00  | (2018.01) |

(52) U.S. Cl.
CPC ......... *H04N 13/128* (2018.05); *H04N 13/161* (2018.05); *H04N 13/243* (2018.05); *H04N 2013/0081* (2013.01)

(58) Field of Classification Search
CPC .. H04N 13/128; H04N 13/161; H04N 13/243; H04N 2013/0081; H04N 13/239; G06K 9/6288; G06T 5/50; G06T 2207/20221

USPC ........................................................... 348/48
See application file for complete search history.

(56) References Cited

U.S. PATENT DOCUMENTS

| 11,450,018 B1* | 9/2022 | Satat .................. B25J 13/089 |
| 11,526,702 B2* | 12/2022 | Yang .................. G06T 7/269 |
| 11,651,581 B2* | 5/2023 | Devitt .................. G06T 7/579 |
| | | 382/190 |
| 2007/0298867 A1* | 12/2007 | Huang ................ G07F 17/3288 |
| | | 463/25 |
| 2012/0249746 A1* | 10/2012 | Cornog .................. G06T 7/97 |
| | | 348/46 |
| 2014/0161338 A1* | 6/2014 | Machado ............ A61B 5/0042 |
| | | 382/131 |
| 2018/0293748 A1* | 10/2018 | Lee .................. H04N 13/25 |
| 2018/0302606 A1* | 10/2018 | Lee ................ H04N 13/239 |
| 2019/0130208 A1* | 5/2019 | Michael .............. G06V 20/00 |
| 2020/0090358 A1* | 3/2020 | Sun .................. G06T 7/97 |
| 2021/0065379 A1* | 3/2021 | Zhang .................. G06T 5/002 |
| 2021/0125307 A1* | 4/2021 | Ranade .............. H04N 5/2621 |

* cited by examiner

*Primary Examiner* — Tung T Vo
(74) *Attorney, Agent, or Firm* — Innovation Counsel LLP (57) ABSTRACT

A fusion method and a fusion system for multiple depth information are provided. A first depth information is obtained by a first image capturing module. A second depth information is obtained by a second image capturing module. Through a non-linear transformation, the first depth information is transformed into a first transformation information, and the second depth information is processed according to the first transformation information to generate a transformed information; or the first depth information and the second depth information are merged to be a fusion information, which is then transformed into the transformed information through the nonlinear transformation.

18 Claims, 7 Drawing Sheets

FUSION METHOD AND FUSION SYSTEM FOR MULTIPLE DEPTH INFORMATION

This application claims the benefit of US Provisional application for patent with Ser. No. 63/011,246, filed on Apr. 16, 2020, the present disclosure of which is incorporated by reference herein in its entirety.

TECHNICAL FIELD

The present disclosure relates to a fusion method and a fusion system, and more particularly to a fusion method and a fusion system for multiple depth information.

BACKGROUND

Along with the advance in technology, a stereoscopic display technology is provided. According to the stereoscopic display technology, several pieces of depth information with different baselines/depth disparity can be merged, such that the strengths of various aspects can be obtained. For depth information with different depth disparity to be located on the same basis, the depth information needs to be processed with a normalization operation. Generally speaking, the normalization operation is to multiply the depth disparity with the same value through a linear transformation. However, the augmentation in the number of bits will be greatly increased.

Although the fusion of multiple depth information can achieve a de-occlusion effect, the depth information with higher precision cannot be obtained in the conventional de-occlusion procedure because the baseline normally lacks enough length.

SUMMARY

The present disclosure relates to a fusion method and a fusion system for multiple depth information. Since the information is transformed through a non-linear transformation, the number of bits will not be greatly augmented. Besides, since the optical center conversion technology makes full use of depth information with highest precision during the de-occlusion procedure, the precision level of the fusion result can be greatly increased.

According to an aspect of the present disclosure, a fusion method for multiple depth information is disclosed. The fusion method for multiple depth information includes the following steps. A first depth information is obtained by a first image capturing module. A second depth information is obtained by a second image capturing module. Through a non-linear transformation, the first depth information is transformed into a first transformation information and the second depth information is processed according to the first transformation information to generate a transformed information; or, the first depth information and the second depth information are merged to be a fusion information, which is then transformed into the transformed information through the non-linear transformation.

According to another aspect of the present disclosure, a fusion system for multiple depth information is disclosed. The fusion system for multiple depth information includes a first image capturing module, a second image capturing module, a depth generation unit and a fusion unit. The depth generation unit is used to obtain a first depth information using a first image capturing module and obtain a second depth information using a second image capturing module. Through a non-linear transformation, the fusion unit transforms the first depth information into a first transformation information and processes the second depth information according to the first transformation information to generate a transformed information; or the fusion unit merges the first depth information and the second depth information to be a fusion information, and then transforms the fusion information into the transformed information through the non-linear transformation.

For the and other aspects of the present disclosure to be better understood, detailed descriptions of a number of embodiments are disclosed below with accompanying drawings.

DETAILED DESCRIPTION

Figure 1:
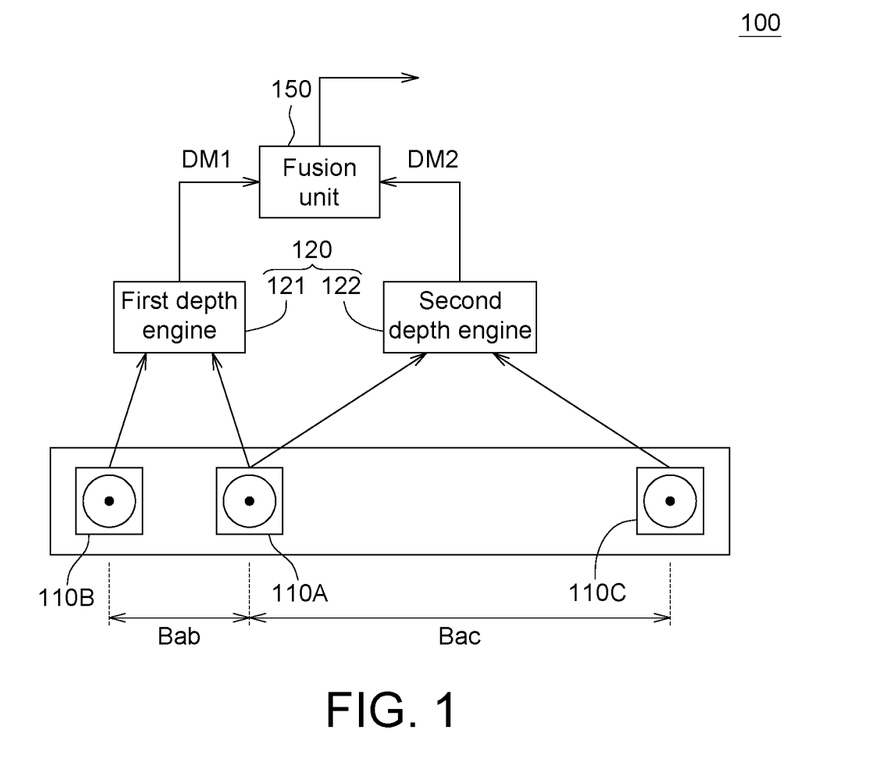
FIG. 1 is a schematic diagram of a fusion system for multiple depth information according to an embodiment.

Referring to FIG. 1, a schematic diagram of a fusion system 100 for multiple depth information according to an embodiment is shown. The fusion system 100 includes a first image capturing module (not marked in the diagram) composed of a first image capturing unit 110A and a second image capturing unit 110B, a second image capturing module (not marked in the diagram) composed of the second image capturing unit 110B and a third image capturing unit 110C, a depth generation unit 120 and a fusion unit 150. The first image capturing unit 110A, the second image capturing unit 110B, and the third image capturing unit 110C are used to capture color images, grayscale images or infrared images, and can be realized by such as color cameras, black and white cameras or infrared cameras. The depth generation unit 120, for example, includes a first depth engine 121 and a second depth engine 122. In another embodiment, the depth generation unit 120 may include only a depth engine. The fusion unit 150 is used to merge several pieces of depth information. The depth generation unit 120 and/or the fusion unit 150 can be realized such as a circuit, a chip, a cloud computing center, a code, a circuit board, or a storage device for storing code. During the fusion process, the depth information needs to be transformed. However, the number of bits may be greatly augmented during the transformation process. The fusion system 100 of the present embodiment transforms information through a non-linear transformation, such that the augmentation in the number of bits can be reduced and the data volume of the stored data can be decreased. Detailed descriptions of the operation of the fusion system 100 of the present embodiment are disclosed below with accompanying drawings.

Figure 2:
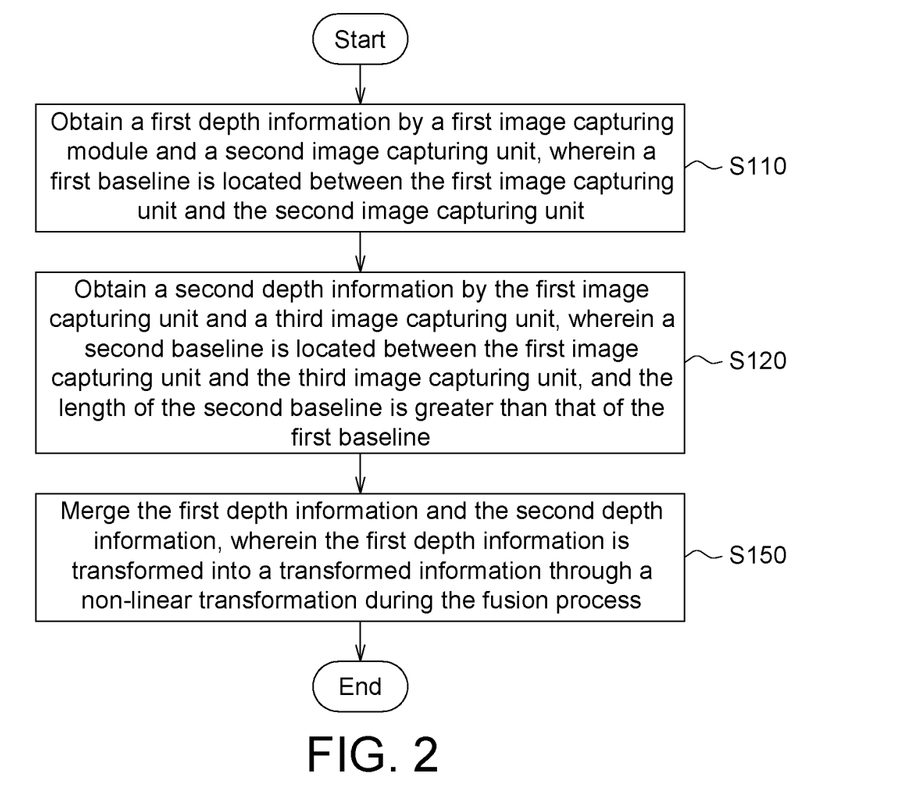
FIG. 2 is a flowchart of a fusion method for multiple depth information according to an embodiment.
Figure 3:
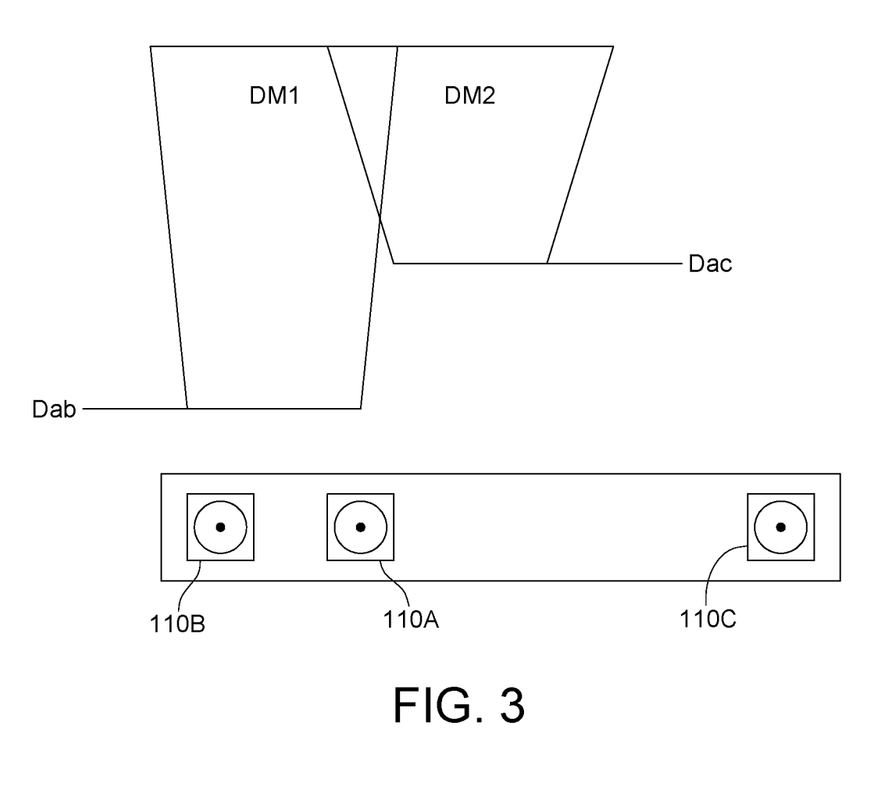
FIG. 3 is a schematic diagram illustrating disparity according to an embodiment.

Referring to FIG. 2, a flowchart of a fusion method for multiple depth information according to an embodiment is shown. In step S110, a first depth information DM1 is obtained by the first depth engine 121 of the depth generation unit 120 according to the first image capturing unit 110A and the second image capturing unit 110B. A first baseline Bab with a length of such as 3 cm is located between the first image capturing unit 110A and the second image capturing unit 110B. Referring to FIG. 3, a schematic diagram illustrating disparity according to an embodiment is shown. The first depth information DM1 has a first depth disparity Dab. In the present disclosure, the first depth information DM1 refers to the overall frame.

Next, the method proceeds to step S120, a second depth information DM2 is obtained by the second depth engine 122 of the depth generation unit 120 according to the first image capturing unit 110A and the third image capturing unit 110C. A second baseline Bac with a length of such as 12 cm is located between the first image capturing unit 110A and the third image capturing unit 110C. The length of the second baseline Bac is greater than that of the first baseline Bab. The second depth information DM2 has a second depth disparity Dac. The length of the second baseline Bac is greater than that of the first baseline Bab, and the ratio of the second baseline Bac to the first baseline Bab is such as 4. In the present disclosure, the second depth information DM2 refers to the overall frame.

Step S110 and step S120 can also be performed concurrently or in opposite orders, and the orders of the steps are not restricted in the present invention.

Then, the method proceeds to step S150, the first depth information DM1 and the second depth information DM2 are merged by the fusion unit 150. In step S150, the first depth information DM1 is transformed into a transformed information by the fusion unit 150 through a non-linear transformation. During the fusion process of the depth information, the depth information needs to be transformed. The conventional transformation process may greatly augment the number of bits. However, if the information is transformed through the non-linear transformation of the present invention, the augmentation in the number of bits of the transformed information can be reduced and the volume of the stored data can be decreased. In the present disclosure, the transformed information refers to the overall frame.

Conventionally, the first depth information DM1 is transformed through a linear transformation. For example, the linear transformation is expressed as formula (1) below. The second baseline Bac and the first baseline Bab have a ratio r.

$$D1'=D1*r \qquad (1)$$

Figure 4:
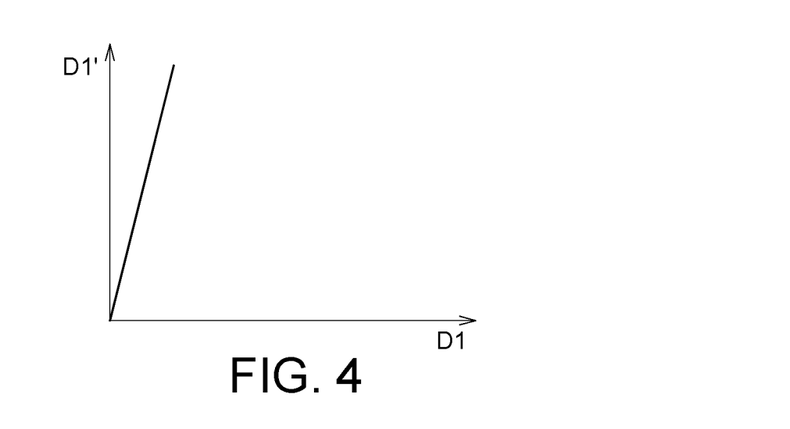
FIG. 4 is a schematic diagram illustrating linear transformation according to an embodiment.

Referring to FIG. 4, a schematic diagram illustrating linear transformation according to an embodiment is shown. The data D1 originally has values of "0, 1, 2, 3." Through a linear transformation, then the data D1 is transformed into data D1' with values of "0, 4, 8, 12". In order to store the data D1' with values of "0, 4, 8, 12", 2 additional bits are needed, hence causing a great augmentation in the number of bits. Since the values of 5, 6, 7, 9, 10, 11 do not exist between the values of 4, 8, 12, many data volume is wasted. After the data D1 is processed with a linear transformation according to the formula (1), the values of the linearly transformed data D1' skip with larger intervals, hence causing a great augmentation in the number of bits. In the present disclosure, each of the data D1 and data D1' refers to the value of a pixel.

Figure 5:
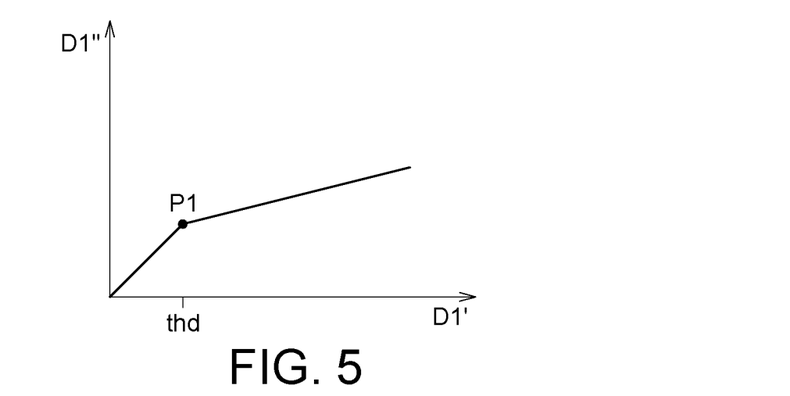
FIG. 5 is a schematic diagram illustrating non-linear transformation according to an embodiment.

To avoid a great augmentation in the number of bits, in the present embodiment, information is transformed through a non-linear transformation. Referring to FIG. 5, a schematic diagram illustrating non-linear transformation according to an embodiment is shown. To reduce the augmentation in the number of bits, the data D1' is processed with a non-linear transformation according to formula (2) and a transformed data D1" is obtained. In the present disclosure, the data D1" refers to the value of a pixel.

$$D1''=(D1'>\text{thd})?\text{thd}+(D1'-\text{thd})/r:D1' \qquad (2)$$

That is, if the data D1' is higher than a threshold thd, then the data D1' is transformed according to a conversion ratio; if the data D1' is not higher than the threshold thd, then the data D1' remains unchanged. The threshold thd is such as the maximum value of the second depth information DM2 with a second depth disparity Dac. The conversion ratio is a reciprocal of the ratio r of the second baseline Bac to the first baseline Bab (illustrated in FIG. 7), that is, 1/r. As indicated in FIG. 5, the values of the non-linearly transformed data D1" skip with smaller intervals. In the operation of formula (2), the threshold thd is such as 4, and the ratio r is such as 4. Since the data D1' with a value of "0" is not higher than the threshold thd, the original data D1' is used as data D1" with a value of "0". Since the data D1' with a value of "4" is not higher than the threshold thd, the original data D1' is used as data D1" with a value of "4". Since the data D1' with a value of "8" is higher than the threshold thd, the data D1" is obtained through an operation of "the threshold thd+(the data D1'−the threshold thd)/ratio r", and a value of "5" is obtained (that is, 4+(8−4)/4=5). Since the data D1' with a value of "12" is higher than the threshold thd, the data D1" is obtained through an operation of "the threshold thd+(the data D1', the threshold thd)/ratio r" and a value of 6 (that is, 4+(12−4)/4=6)". That is, the data D1' with values of "0, 4, 8, 12" can be transformed into data D1" with values of "0, 4, 5, 6" according to formula (2). The values of the non-linearly transformed data D1" skip with smaller intervals.

The formula (1) and the formula (2) can be combined to form formula (3):

$$D1''=(D1*r>\text{thd})?\text{thd}+(D1*r-\text{thd})/r:D1*r \qquad (3)$$

Figure 6:
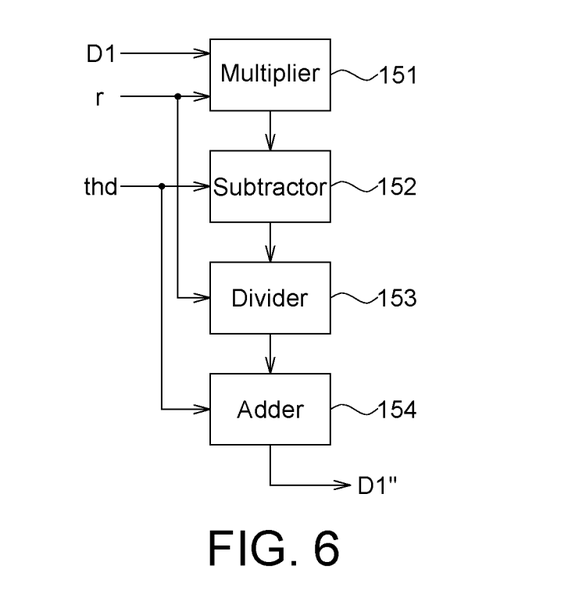
FIG. 6 is a circuit diagram of non-linear transformation according to an embodiment.

Referring to FIG. 6, a circuit diagram of non-linear transformation according to an embodiment is shown. The circuit diagram of FIG. 6 is used to implement the non-linear transformation of formula (3). The data D1 and the ratio r are inputted to a multiplier 151 for a multiplication operation. The output result of the multiplier 151 and the threshold thd are inputted to the subtractor 152 for a subtraction operation. Then, the output result of the subtractor 152 and the ratio r are inputted to the divider 153 for a division operation. Lastly, the output result of the divider 153 and the threshold thd are inputted to the adder 154 for an addition operation, and a data D1" is obtained.

In another embodiment, the formula (3) can be simplified as formula (4):

$$D1''(\text{cond})?D1+\text{thd}':D1*r$$

$$\text{thd}'=\text{thd}-\text{thd}/r$$

$$\text{cond is such as } D1*r>\text{thd} \qquad (4)$$

Figure 7:
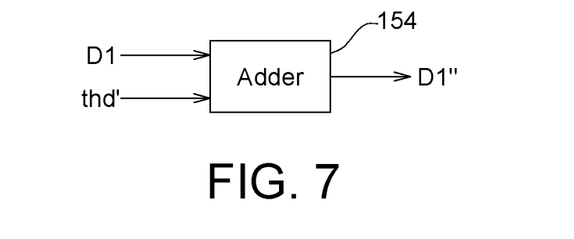
FIG. 7 is a circuit diagram of non-linear transformation according to another embodiment.

Referring to FIG. 7, a circuit diagram of non-linear transformation according to another embodiment is shown. The circuit diagram of FIG. 7 is used to implement the operation of formula (4). The data D1 and the threshold thd' are inputted to the adder 154 for an addition operation to obtain data D1". The threshold thd' can be pre-stored in a memory in the form of parameter without performing any operation. Generally speaking, the circuit structure of the adder 154 is very simply and can be implemented without using too many logic elements. The circuit structure of the divider 153 is very complicated and requires many logic elements. The circuit designer can adopt the design of FIG. 7 to reduce circuit complexity as well as operation delay and system load. For example, in the operation of formula (4), the threshold thd is such as 4, and the ratio r is such as 4. The above data D1 with values of "0, 1" does not need to be processed with an operation of "data D1+the threshold thd'". The above data D1 with a value of "2" is processed with an operation of "data D1+the threshold thd'", and a data D1" with a value of 5 (that is, 2+3=5) is obtained. The above data D1 with a value of "3" is processed with an operation of "data D1+the threshold thd'", and a data D1" with a value of 6 (that is, 3+3=6) is obtained. That is, the data D1 with values of "2, 3" can be processed with a simple addition operation to obtain the data D1 with values of "5, 6".

In another embodiment, the non-linear transformation of step S150 can be implemented through a bitwise right-shift operation. To reduce the augmentation in the number of bits, the data D1' can be processed with the non-linear transformation according to formula (5).

$$D1"=(cond)?(D1>>s)+thd':D1'$$

$$\text{cond is such as } D1'>\text{thd} \quad (5)$$

In formula (5), s is such as 1. That is, the bitwise right-shift operation of formula (5) is a 1-bit right-shift operation. For example, the data D1' with values of "8, 12, 16, 32" is originally processed with a linear transformation but is now processed with a 1-bit right-shift operation and is transformed into a data D1" with values of "4, 6, 8, 16". Through the 1-bit right-shift operation, the value of the data D1" can be effectively reduced, and the augmentation in the number of bits can also be avoided.

Figure 8:
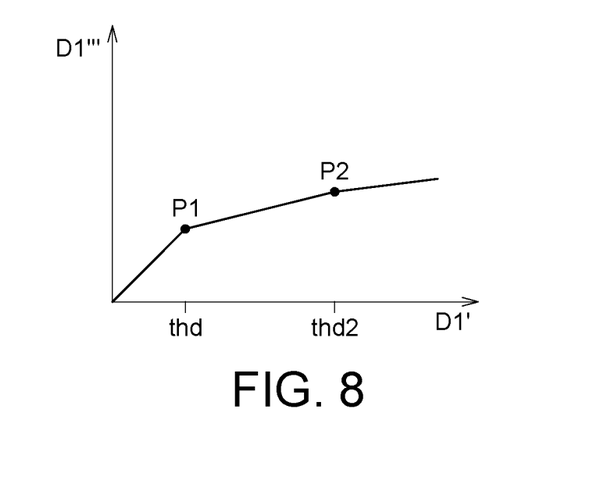
FIG. 8 is a schematic diagram illustrating non-linear transformation according to another embodiment.

Referring to FIG. 8, a schematic diagram illustrating non-linear transformation according to another embodiment is shown. In some embodiments, when 3 pieces of depth information need to be merged, the augmentation in the number of bits will become even worse. The data D1' can be processed with a non-linear transformation in two stages as indicated in FIG. 8. FIG. 8 illustrates 2 turning points P1 and P2. The values of the non-linearly transformed data D1''' skip with smaller intervals. Additionally, the non-linear transformation of the present embodiment can further be used in the fusion process of 4 pieces of depth information, 5 pieces of depth information, or even an unlimited number of depth information. As long as multiple turning points are used, the skip interval of the values can be reduced. In the present disclosure, the data D1''' refers to the value of a pixel.

After the data D1 is transformed into data D1', data D1" or data D1''', the data volume and logic size of the memory required in the operation can be greatly reduced. Through operation, the data D1', data D1" or data D1''' can be inverse-transformed into data D1, and correct depth information can be obtained.

Through the embodiments, during the fusion process, the first depth information DM1 and the second depth information DM2 can be transformed through a non-linear transformation to avoid the number of bits being greatly augmented.

Besides, the above operations of non-linear transformation can be performed before fusion selection. Or, the above operations of non-linear transformation can be performed after fusion selection. The present invention does not restrict the orders of the operations of non-linear transformation. If the operations of non-linear transformation are performed before the fusion operation, the present invention can have the following implementations. Firstly, the first depth information DM1 is transformed into a first transformation information through a non-linear transformation, then the first transformation information and the second depth information DM2 are merged. Or, firstly, the first depth information DM1 is transformed into a first transformation information and the second depth information DM2 is transformed into a second transformation information through a non-linear transformation, then the first transformation information and the second transformation information are merged. If the operations of non-linear transformation are performed after the fusion operation, the fusion information is transformed into a transformed information through the non-linear transformation only after the first depth information and the second depth information are merged to be a fusion information. The present invention does not restrict the orders of the operations of non-linear transformation and the operation of fusion selection.

Figure 9:
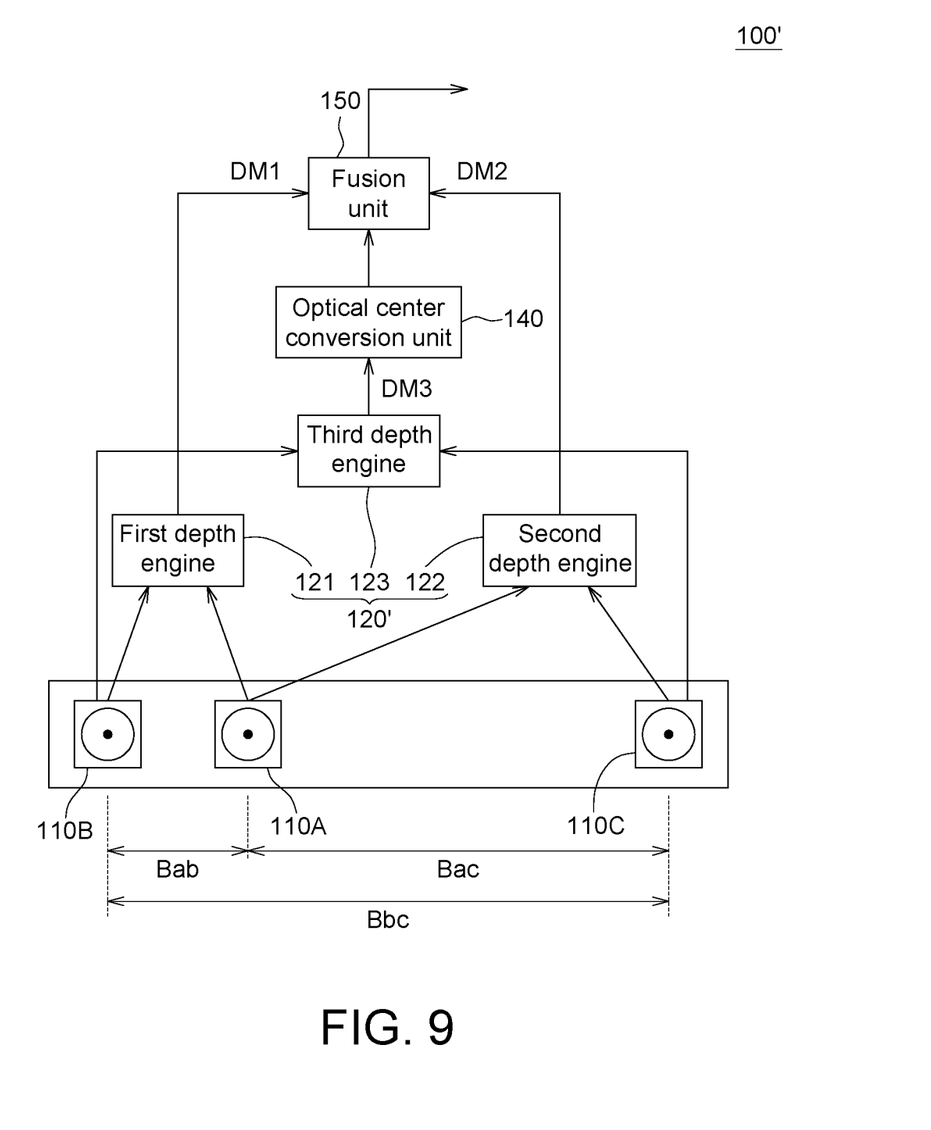
FIG. 9 is a schematic diagram of a fusion system for multiple depth information according to another embodiment.

Moreover, the fusion of multiple depth information can produce a de-occlusion effect. Referring to FIG. 9, a schematic diagram of a fusion system 100' for multiple depth information according to another embodiment is shown. The fusion system 100' includes a first image capturing unit 110A, a second image capturing unit 110B, a third image capturing unit 110C, a depth generation unit 120, an optical center conversion unit 140 and a fusion unit 150.

Generally speaking, during the de-occlusion procedure, the optical center of 2 pieces of depth information must be located at the same position. Let FIG. 9 be taken for example. The first image capturing unit 110A is located between the second image capturing unit 110B and the third image capturing unit 110C. An optical center of the first depth information DM1 is configured on the first image capturing unit 110A. An optical center of the second depth information DM2 is configured on the first image capturing unit 110A. The first baseline Bab with a length of such as 3 cm is located between the first image capturing unit 110A and the second image capturing unit 110B. The second baseline Bac with a length of such as 12 cm is located between the first image capturing unit 110A and the third image capturing unit 110C. Generally speaking, the larger the length of the baseline, the higher the precision of the depth information. If the de-occlusion procedure is performed according to the first depth information DM1 and the second depth information DM2, then only the precision of the first baseline Bab and the second baseline Bac can be used. In the present embodiment, a third baseline Bbc with a length of such as 15 cm is located between the second image capturing unit 110B and the third image capturing unit 110C. In the present embodiment, the third baseline Bbc is used to increase the precision of the depth information in the de-occlusion procedure. Details of the de-occlusion procedure performed using the fusion method of the present embodiment are disclosed below with an accompanying flowchart.

Figure 10:
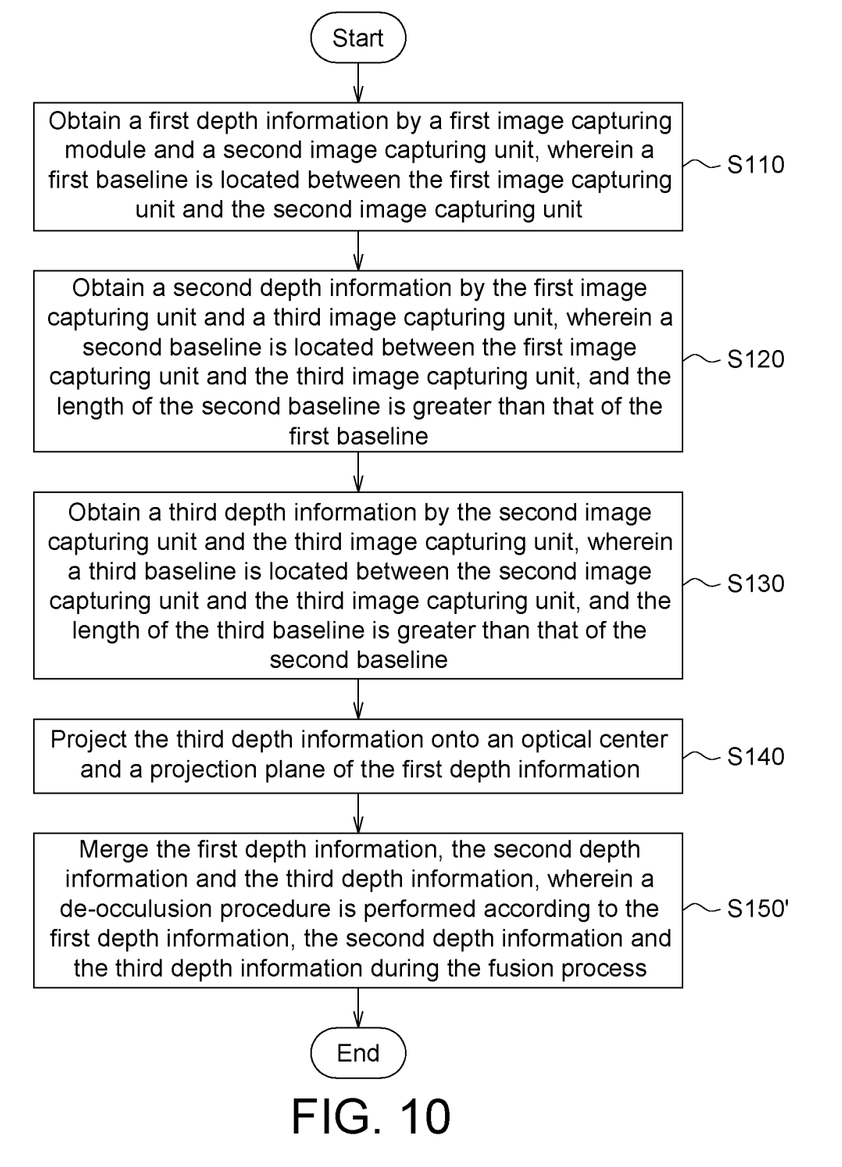
FIG. 10 is a flowchart of a fusion method for multiple depth information according to another embodiment.

Referring to FIG. 10, a flowchart of a fusion method for multiple depth information according to another embodiment. In the fusion method of FIG. 10, the precision of the de-occlusion procedure can be increased. In step S110, a first depth information DM1 is obtained by the first depth engine 121 of the depth generation unit 120 according to the first image capturing unit 110A and the second image capturing unit 110B.

Next, the method proceeds to step S120, a second depth information DM2 is obtained by the second depth engine 122 of the depth generation unit 120 according to the first image capturing unit 110A and the third image capturing unit 110C.

Then, the method proceeds to step S130, a third depth information DM3 is obtained by the third depth engine 123 of the depth generation unit 120' according to the second image capturing unit 110B and the third image capturing unit 110C. A third baseline Bbc is located between the second image capturing unit 110B and the third image capturing unit 110C. The length of the third baseline Bbc is greater than that of the second baseline Bac and the first baseline Bab. The length of the third baseline Bbc is such as 15 cm. Since the third baseline Bbc has the largest length, the third depth information DM3 has the highest precision.

Steps S110, S120, S130 can be performed concurrently. Or, steps S110, S120, S130 can be performed in arbitrary orders. The present invention does not restrict the orders of steps S110, S120, S130.

Then, the method proceeds to step S140, the third depth information DM3 is projected onto the optical center and projection plane of the first depth information DM1 by the optical center conversion unit 140. In the present step, after the spatial relation between the third depth information DM3 and the first depth information DM1 (such as an external parameter) is obtained by the optical center conversion unit 140, the third depth information DM3 is projected onto the optical center and the projection plane of the first depth information DM1 according to the spatial relation.

Then, the method proceeds to step S150', the first depth information DM1, the second depth information DM2 and the third depth information DM3 are merged by the fusion unit 150. In step S150', a de-occlusion procedure is performed by the fusion unit 150 at the same time. In the present embodiment, when the fusion unit 150 performs the de-occlusion procedure, the third depth information DM3 with highest precision can be fully used, such that the precision of the fusion result can be greatly increased.

In the present embodiment, the first image capturing module is composed of the first image capturing unit 110A and the second image capturing unit 110B, and the second image capturing module is composed of the second image capturing unit 110B and the third image capturing unit 110C. In some embodiments of the present invention, the first image capturing module can be composed of the first image capturing unit 110A and the second image capturing unit 110B, and the second image capturing module can be composed of the third image capturing unit 110C and the fourth image capturing unit (not marked in the diagram). Since the first image capturing module and the second image capturing module do not share the image capturing unit, the optical center needs to be transformed by the optical center conversion unit 140 before the non-linear transformation of the present invention can be performed. For example, when an optical center of the first depth information is configured on the first image capturing unit and an optical center of the second depth information is configured on the third image capturing unit, the optical center conversion unit 140 is used to convert the two optical centers to be the same. For example, the non-linear transformation of the present invention can be performed only after the second depth information is projected onto the optical center and the projection plane of the first depth information.

While the present disclosure has been disclosed above in a number of embodiments, the present disclosure is not limited thereto. Anyone ordinary skilled in the technology field of the present disclosure can make various modifications and variations without violating the spirit and scope of the present disclosure. Therefore, the scope of protection of the present disclosure is defined according to the following claims.

What is claimed:

1. A fusion method for multiple depth information, comprising:
    obtaining a first depth information by a first image capturing module;
    obtaining a second depth information by a second image capturing module; and
    through a non-linear transformation, transforming the first depth information into a first transformation information and processing the second depth information according to the first transformation information to generate a transformed information; or, merging the first depth information obtained by the first image capturing module and the second depth information obtained by the second image capturing module to be a fusion information, and then transforming the fusion information into the transformed information through the non-linear transformation;
    wherein through the non-linear transform, a number of bits of the fused depth information or the transformed information is equal to or less than a number of bits of the first depth information.

2. The fusion method for multiple depth information according to claim 1, wherein the step of processing the second depth information according to the first transformation information to generate the transformed information further comprises:
    transforming the second depth information into a second transformation information; and
    merging the first transformation information and the second transformation information to generate the transformed information.

3. The fusion method for multiple depth information according to claim 1, wherein the step of processing the second depth information according to the first transformation information to generate the transformed information further comprises:
    merging the first transformation information and the second depth information to generate the transformed information.

4. The fusion method for multiple depth information according to claim 1, wherein the non-linear transformation is performed according to a conversion ratio.

5. The fusion method for multiple depth information according to claim 4, wherein the first image capturing module further comprises a first image capturing unit and a second image capturing unit, and a first baseline is located between the first image capturing unit and the second image capturing unit;
    the second image capturing module further comprises the first image capturing unit and a third image capturing unit, and a second baseline is located between the first image capturing unit and the third image capturing unit; and
    the conversion ratio is a reciprocal of a ratio of the second baseline to the first baseline.

6. The fusion method for multiple depth information according to claim 1, wherein the fusion information is transformed through the non-linear transformation using a bitwise right-shift operation.

7. The fusion method for multiple depth information according to claim 6, wherein the bitwise right-shift operation is a 1-bit right-shift operation.

8. The fusion method for multiple depth information according to claim 1, wherein the first image capturing module further comprises a first image capturing unit and a second image capturing unit, and an optical center of the first depth information is configured on the first image capturing unit; the second image capturing module further comprises a third image capturing unit and a fourth image capturing unit, and an optical center of the second depth information is configured on the third image capturing unit; the fusion method further comprises:

projecting the second depth information onto the optical center and a projection plane of the first depth information.

9. The fusion method for multiple depth information according to claim 1, wherein the first image capturing module further comprises a first image capturing unit and a second image capturing unit; the second image capturing module further comprises the second image capturing unit and a third image capturing unit, the first image capturing unit is located between the second image capturing unit and the third image capturing unit, an optical center of the first depth information is located between the first image capturing unit, and an optical center of the second depth information is configured on the first image capturing unit; the fusion method further comprises:

obtaining a third depth information according to the second image capturing unit and the third image capturing unit;

projecting the third depth information onto the optical center and a projection plane of the first depth information; and performing a de-occlusion procedure on the second depth information and the third depth information according to the first depth information.

10. A fusion system for multiple depth information, comprising:

a first image capturing module;

a second image capturing module;

a depth generation unit used to obtain a first depth information using a first image capturing module and to obtain a second depth information using a second image capturing module; and a fusion unit used to transform the first depth information into a first transformation information through a non-linear transformation and process the second depth information according to the first transformation information to generate a transformed information; or, used to merge the first depth information obtained by the first image capturing module and the second depth information obtained by the second image capturing module to be a fusion information, and then transform the fusion information into the transformed information through the non-linear transformation;

wherein through the non-linear transform, a number of bits of the fused depth information or the transformed information is equal to or less than a number of bits of the first depth information.

11. The fusion system for multiple depth information according to claim 10, wherein when the fusion unit processes the second depth information according to the first transformation information to generate the transformed information, the fusion unit transforms the second depth information into a second transformation information and merges the first transformation information and the second transformation information to generate the transformed information.

12. The fusion system for multiple depth information according to claim 10, wherein when the fusion unit process the second depth information according to the first transformation information to generate the transformed information, the fusion unit merges the first transformation information and the second depth information to generate the transformed information.

13. The fusion system for multiple depth information according to claim 10, wherein the non-linear transformation is performed according to a conversion ratio.

14. The fusion system for multiple depth information according to claim 13, wherein the first image capturing module further comprises a first image capturing unit and a second image capturing unit, and a first baseline is located between the first image capturing unit and the second image capturing unit;

the second image capturing module further comprises the first image capturing unit and a third image capturing unit, and a second baseline is located between the first image capturing unit and the third image capturing unit; and the conversion ratio is a reciprocal of a ratio of the second baseline relative to the first baseline.

15. The fusion system for multiple depth information according to claim 10, wherein the fusion information is transformed through the non-linear transformation using a bitwise right-shift operation.

16. The fusion system for multiple depth information according to claim 15, wherein the bitwise right-shift operation is a 1-bite right-shift operation.

17. The fusion system for multiple depth information according to claim 10, wherein the first image capturing module further comprises a first image capturing unit and a second image capturing unit, and an optical center of the first depth information is configured on the first image capturing unit; the second image capturing module further comprises a third image capturing unit and a fourth image capturing unit, and an optical center of the second depth information is configured on the third image capturing unit, and the fusion system further comprises:

projecting the second depth information onto the optical center and a projection plane of the first depth information.

18. The fusion system for multiple depth information according to claim 10, wherein the first image capturing module further comprises a first image capturing unit and a second image capturing unit; the second image capturing module further comprises the second image capturing unit and a third image capturing unit, the first image capturing unit is located between the second image capturing unit and the third image capturing unit, an optical center of the first depth information is configured on the first image capturing unit, an optical center of the second depth information is configured on the first image capturing unit, and a third depth information is obtained according to the second image capturing unit and the third image capturing unit; the fusion system further comprises:

an optical center conversion unit used to project the third depth information onto the optical center and a projection plane of the first depth information;

wherein the fusion unit performs a de-occlusion procedure according to the first depth information, the second depth information and the third depth information.

\* \* \* \* \*